Patented May 3, 1932

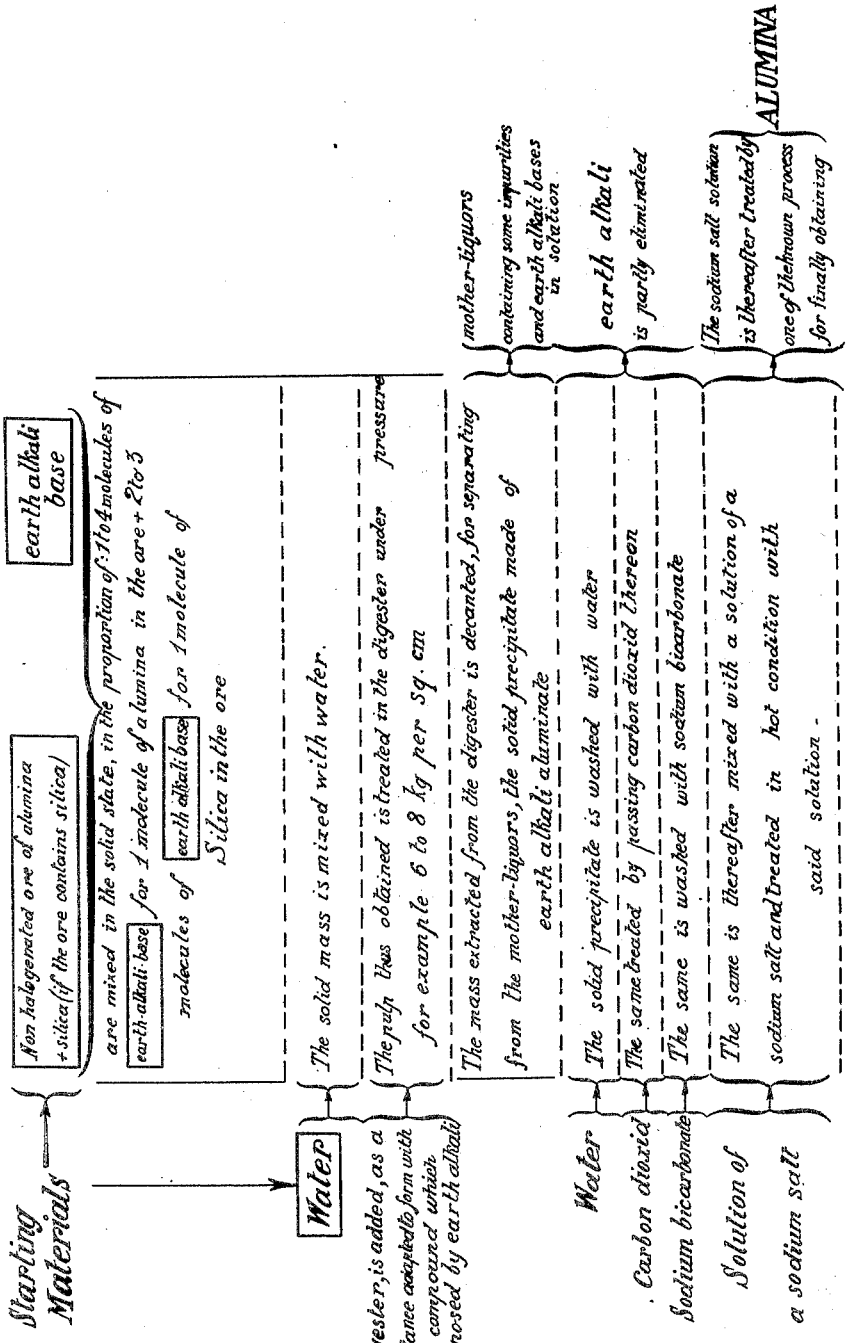

1,856,194

UNITED STATES PATENT OFFICE

JEAN CHARLES SÉAILLES, OF PARIS, FRANCE

PROCESS FOR THE PREPARATION OF ALUMINA

Application filed September 12, 1927, Serial No. 219,168, and in France September 13, 1926.

The preparation of alumina is generally effected by precipitating the alumina from sodium aluminate which has been preliminarily obtained by acting upon the aluminium ores by means of alkaline carbonates, oxides or hydrates.

Such processes afford alumina products which are usually contaminated with silica, in spite of the utilization of aluminium ores containing but little silica. The processes are attended with considerable losses due to the formation of sodium silico-aluminate. A great expenditure of fuel is also required for the successive calcinations, heatings and concentrations which are necessary.

It has been further proposed to employ the alkali earth oxides or carbonates (barium, calcium, magnesium, strontium) which, when mixed with the aluminium ore will afford by a furnace treatment at high temperatures various soluble or insoluble anhydrous aluminates; which may then be converted into sodium aluminate by the action of sodium carbonate or sulphate.

These last-mentioned processes will offer a product which is not purer than the products otherwise obtained. Furthermore, the manufacture of the alkali earth aluminate by the furnace treatment is a complex operation which also required much expense for fuel and is accompanied by the formation of alkali earth silico-aluminates which represent a great loss.

My present process relates to the economical production of alumina from bauxites or clay, or in general from ores which contain no halogens. The process is illustrated diagrammatically in the accompanying drawing.

I have been enabled to treat the aluminium ores containing no halogens by the wet process in the hot or cold state, by means of the alkali earth bases, so as to produce the alkali earth aluminates in the hydrated state, by treating a mixture consisting of the finely pulverized ore and the suitable alkali earth base.

When the ore contains combinations of alumina in addition to the free alumina, I prefer to decompose such combinations by a preliminary roasting. For instance, in the case of clay, a heating to 650–750 degrees C., will destroy the silicate of aluminium and the alumina can be more readily acted upon. With bauxite the temperature is from 500 to 600 degrees.

The raw or calcined ore is treated by the alkali earth base in the presence of water, either in the cold or at the boiling point, and it is preferable to stir the mass continually. The ore might also be treated by water and steam in a digester, to facilitate the hydration, either in the presence of the alkali earth base or before the last treatment.

I usually employ proportions corresponding to an aluminate containing at least one molecule of alkali earth oxide, and preferably two molecules of alkali earth oxide for one molecule of alumina, but I may readily use greater or less proportions, by reason of the multiple aluminates of varied composition which are used.

The resulting aluminate whose formula is $Al_2O_3.nMO + nH_2O$ is soluble as barium aluminate but is insoluble as calcium aluminate. I will indicate the two corresponding treatments, it being understood that the process is also applicable to the strontium and magnesium aluminates.

1. *Case of barium aluminate,*
$$Al_2O_3.nBaO + nH_2O$$

The aluminate is obtained directly in an aqueous solution. The solution is filtered to remove the residues and sediment, and I add to the clear solution the amount of sodium sulphate or carbonate—optionally dissolved and preferably in a slight excess—which is necessary to obtain one of the following reactions:

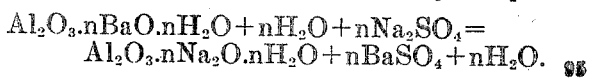

The operation is performed in the hot or the cold state, and with or without pressure. I thus obtain the barium sulphate or carbonate in the precipitated state and the sodium aluminate in solution.

The barium sulphate or carbonate are converted by the known methods into oxide of barium, hydrated or not, which is again used in the manufacture. By the known processes, the sodium aluminate will afford precipitated alumina, and the sodium carbonate can be recovered by precipitation by carbonic acid, and the caustic soda can be recovered by hydrolysis and by the addition of alumina.

I have also found in many cases it is preferable to precipitate the barium aluminate by lime, after filtering and clearing the solution, in such manner as to obtain the following equation:

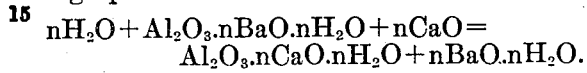

The hydrated oxide of barium remains in solution and is at once utilized, whilst the insoluble calcium aluminate may be treated as follows:—

2. *Case of insoluble calcium aluminate*

I obtain the body $Al_2O_3.nCaO.nH_2O$ as an insoluble mixture with the sediment and residues of the operation. To recover the alumina, the water is partially expelled, and the substance is treated by a sodium carbonate solution in the hot or cold state, with or without pressure, thus obtaining the equation:—

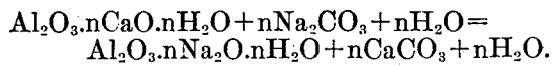

The calcium carbonate remains in the precipitated state; the sodium aluminate is filtered off, and the alumina is then precipitated from its solution by carbonic acid, whereby the sodium carbonate is recovered.

It will be remarked that in this case no concentration need be effected, since the sodium carbonate solution is restored to its original strength by the operation, so that it will only be necessary to concentrate the wash water used to exhaust the residues, if such is required.

If the operation is commenced with the calcium aluminate precipitated by means of the barium aluminate, the precipitated calcium carbonate will be recovered, and since the barium hydrate is recovered without dilution, the operation will be performed without any other consumption of the reagents, save for the necessary losses, and without diluting or concentrating the alkali baths in use.

By my said process I am enabled to obtain sodium aluminate solutions containing hardly any iron, since the reactions in the wet state and without heating in a furnace, have but a negligible action upon the impurities contained in the ore. Furthermore, it is obvious that the expense for fuel will be very small, due to the low temperatures employed and the fact of avoiding the usual dilutions and concentrations.

Also, the use of the alkali earth bases is much more economical than of the alkaline bases, and the losses from formation of silico-aluminates are negligible in virtue of the low temperature in use and the small cost of the base employed, for instance lime which permits the treatment of ores containing a large amount of silica such as the bauxites of low grade, or clays.

As an example of a treatment which is particularly simple and economical, I may mention the action upon a given bauxite in the hot or cold state by a simple mixture of milk of lime with the powdered bauxite, in the proportion of one molecule of lime to one molecule of alumina.

In these conditions, a specimen of bauxite containing 55% of alumina and 16% of silica, was treated by my process; 50% of the aluminium in the bauxite assumed the state of calcium aluminate, and after the filtered aluminate was treated by sodium carbonate and was acted upon by carbonic acid, this alumina was obtained in the precipitated and pure state.

I further obtained remarkable outputs by mixing the alumina ore with an amount of alkali earth base which may exceed four molecules of the base for each molecule of alumina contained in the ore. Such mixtures could be well treated in the digester at a pressure of 6 to 8 kgs. per sq. cm. in the presence of water.

By way of example, I employed a red bauxite containing 59.73 per cent of $Al_2O_3$ which was mixed with lime in the aforesaid proportion of 1 part of $Al_2O_3$ to 4 parts CaO, and 1 part of $SiO_2$ for 2CaO in the cold state; the mixture was treated in the colloidal grinding apparatus together with water, a homogeneous mixture being thus obtained.

The said mixture was treated in the digester at a pressure of 7 kgs. per sq. cm. for only 1½ hours.

The mixture was then taken up by a sodium carbonate solution, and I thus obtained 93.7 to 94.8% of the alumina contained in the bauxite, in two different experiments. In an improvement of an interesting nature, I treat the material in the colloidal (or other) grinding apparatus by placing this apparatus in the interior of the digester itself, so as to offer the combined action of heat and intimate mixing, thus reducing the time of treatment in the digester as well as the amount of fuel consumed.

Should it be desired to obtain an alumina containing a very small proportion of silica, I increase the time of the treatment in the digester and the amount of lime employed, so as to form insoluble silicate of lime and silico-aluminate of lime, by which the silica in the material will be fixed. In this manner, due to the small cost of the lime, I may employ ores rich in silica, whereas in the alkali treatment with the use of soda, the loss of soda would be prohibitive. I might also treat the mixture containing four molecules of lime for one molecule of alumina in the ore, after issuing from the digester, by prolonged washings with water; these as I have found will eliminate a great part of the lime and will allow the sodium carbonate treatment of a substance poor in lime, thus offering a sodium aluminate containing a larger amount of alumina. By continuing the washings in a thorough manner, I may even eliminate almost the whole of the lime and may treat the final residue insoluble in water by means of caustic soda, instead of sodium carbonate; herein I directly obtain sodium aluminate, from which the alumina may be precipitated by the known methods (such as the addition of crystallized alumina) without the formation of carbonate. The solution of sodium aluminate thus weakened will return to the circuit in order to dissolve a fresh quantity of alumina which is again precipitated, and so on, without dilutions or concentrations, the alumina of the insoluble residue being readily soluble in the diluted bath. When the material is discharged from the digester it may be treated in suitable recipients by a soda solution at 22–23 degrees B. in the presence of carbonic acid, there will be formed a liquor of sodium aluminate rich in alumina, with precipitation of calcium carbonate.

The filtered rich solution of aluminate will afford the alumina precipitated by the aforesaid process and also a solution poor in alumina which can be used again for the formation of the rich aluminate, and so on. I thus obviate the continual concentrations and dilutions required in the Bayer process employing caustic soda and the digester treatment.

I have moreover found that for attacking non halogenated ores of alumina it is possible to simultaneously utilize two or several alkali earth bases, some of them giving soluble aluminates and the others giving insoluble aluminates by precipitation, in starting from soluble aluminates. Under these conditions, the presence of soluble salts will facilitate the reaction and increase the yield.

It will thus be possible to use as soluble aluminate the barium aluminate, and as insoluble aluminate, the calcium resulting from the reaction of lime upon the barium aluminate.

Thus for example a mixture of lime, baryta, bauxite and water can be treated in the digester, the quantity of baryta varying between very small quantities acting by a sort of catalyzation and quantities which are as high as desired for accelerating the reactions.

The quantity of lime will be at least equal to that which is required for precipitating in the state of calcium aluminate the whole of the alumina which is capable of being combined with baryta. Accordingly, on leaving the digester, one will recover the baryta which will remain dissolved in water and which will be used again indefinitely except what gets lost, and one will obtain, in the state of slush, the calcium aluminate mixed with the residues of the operation; this calcium aluminate treated by the known processes gives the alumina; for example one will treat by sodium carbonate, which gives the soluble sodium aluminate and the insoluble calcium carbonate, this aluminate being then precipitated by $CO_2$ or utilized by the known processes.

The arrangements herein described are given by way of example and the details for carrying out the invention can vary in all cases without modifying the principle of said invention. It is namely possible to use a mixture of several alkali earth bases for obtaining a mixture of aluminates and the like, or extracting from the sodium aluminate, not only the alumina but any desired salts of alumina which will be desired. Instead of treating the alkali earth base, in the presence of water, after a previous calcination, I have found that it would also be possible to simultaneously calcinate the aluminous ore and the alkali earth base in a proportion of more of 3 molecules of base for one molecule of alumina or of silica.

It has been found that under these conditions instead of forming a clinkerized and hard rock, the baking operation gives a mass which can be very easily pulverized and which contains all the elements as required for the subsequent moist treatment.

Particularly, when starting from bauxite (or clay) and calcium carbonate, the mixture will be advantageously formed in such manner as to have:

$$4CaO \text{ for } 1 \ Al_2O_3$$
$$2CaO \text{ for } 1 \ SiO_2$$

The homogeneous mixture will be baked beyond 1000°. The baked mass is pulverized at once in water and produces directly the tetracalcium aluminate from which alumina can be extracted by the known processes.

The process distinguishes itself from the known process which consists in forming the anhydrous alkali-earth aluminate by baking, by the fact that the definite anhydrous aluminates are hard masses, which are not very soluble and can only be pulverized with great difficulty.

On the contrary, the presence of an important excess of an alkaline-earth base during the baking operation, gives products in which the excess of base results in the formation of substances which can be very easily attacked by water and which, when treated by solutions of carbonate of soda, give without any difficulty the solution of sodium aluminate which is then precipitated by the carbonic acid or which is treated by the known means.

During my researches, I found that the alkaline earth aluminate formed in the digester—preferably with an excess of the base—would produce, after the aforesaid treatment with soda salts, a solution of sodium aluminate containing a certain proportion of silica capable of dissolving in the bath which is then precipitated together with the alumina, and whose presence is not desirable, chiefly as concerns the use of the alumina in the manufacture of aluminium.

I find that by regulating the temperature of the pressure, and the duration of the heating in the digester, it is feasible to greatly reduce the proportion of silica which may be dissolved in the aluminate bath.

I further note that as concerns the action by lime, it is feasible, by reducing either the temperature and pressure, or the duration, or both at once, to greatly reduce the proportion of silica which may be dissolved, without any great decrease in the quantity of calcium aluminate produced. In this manner a given bauxite which is treated by lime in the digester and is then taken up by sodium carbonate will allow the alumina and the silica to be dissolved, and when precipitated, the following proportions will be obtained:—

Heating at 8 kgs. pressure for 8 hours: $Al_2O_3$ 96.97 per cent, $SiO_2$ 3.03 per cent.

Heating at 8 kgs. pressure for 1½ hours: $Al_2O_3$ 99.10 per cent, $SiO_2$ 0.90 per cent.

Heating at 4 kgs. pressure for 1½ hours: $Al_2O_3$ 99.55 per cent, $SiO_2$ 0.45 per cent.

The amount of alumina extracted from the bauxite was 83.8 per cent in the first case, 81.75 per cent in the second case and 70.25 per cent in the third case.

The proportion of silica may thus be made very small, without any excessive reduction in the yield. I further observe that the time and the temperature might be still further reduced and the yield increased, by the use of catalysts consisting of substances which are adapted to combine with the lime or the alkali earth base in soluble form and which may be decomposed by $Al_2O_3$ to produce calcium aluminate or an alkali earth aluminate, such for instance as the sulphonated organic derivatives and in general the acids which are weaker with reference to CaO than to $Al_2O_3$ such as benzene sulphonic acid, sulphoricinoleic acid and others.

By treating the same bauxite in the colloidal grinding apparatus before it is placed in the digester, or in the digester itself, the yield will be increased.

I have further observed during my researches, firstly that the amount of silica dissolved in the sodium aluminate bath may also be much reduced by a suitable method of action, and secondly that the sodium aluminate bath which is contaminated by silica may be purified by a suitable treatment, and lastly that such methods may be employed either conjointly or separately according to the degree of purity to be obtained.

The reduction of the amount of silica dissolved in the sodium aluminate bath has been obtained by avoiding the presence of an excess of free caustic soda (or potash) when the alkali earth aluminate is acted upon by the sodium carbonate.

Taking as an example the tetracalcium aluminate which is formed in the digester, I produce by the action of sodium carbonate.

The excess of soda acts upon the silica, which is thus dissolved.

I find that this prejudicial effect may be obviated by several methods, as follows:—

(a) By washing the tetracalcium aluminate, which allows the lime to be dissolved, so that the amount of calcium carbonate to be formed will diminish at the same time as the amount of free soda, the equilibrium being attained when 2½ molecules of lime have been removed from the tetracalcic aluminate.

(b) By treating the tetracalcium aluminate with a certain quantity of carbonic acid which is sufficient to convert into carbonate 2½ molecules of lime out of the 4 molecules present.

(c) By the use of sodium bicarbonate, or otherwise the whole or a part of the carbonate, optionally combining this process with those specified in clauses (a) and (b), in such proportions that the free soda shall not appear in the solutions, or shall appear in a reduced quantity which may be graduated at will.

These three methods may obviously be combined, and they may also be utilized in combination with the purifying process which I will describe as follows:—

When a sodium aluminate solution contaminated with dissolved silica is placed in contact with calcium aluminates, there will evidently be no reaction between the two aluminates, but the silica will react upon the calcium aluminate and will be precipitated for the major part.

I have thus observed that a solution which gave a precipitate containing 96.8 per cent of $Al_2O_3$ and 3.2 per cent of silica, would afford, after it was treated with some 10 per cent of calcium aluminate (monocalcium aluminate), 98.21 per cent of $Al_2O_3$ and 1.79 per cent of silica.

It was also found that the calcium aluminate used in the purifying process might consist simply of the raw material discharged from the digester.

A liquor which gave a precipitate of $Al_2O_3$ 96.97 per cent and $SiO_2$ 3.02 per cent, thus placed in contact with a great excess of crude calcium aluminate 4 parts by weight of raw material for 1 part of alumina contained in the solution was found to give a precipitate containing $Al_2O_3$ 00.84 per cent and $SiO_2$ only 0.16 per cent.

On a manufacturing scale, I proceed by one of the numerous methods in current use for exhausting the product, so as to utilize the purifying effect in a systematic manner. Instead of operating by exhaustion, I may also proceed with the treatment of large masses of material; for instance, I may start with a mass of 11,000 kgs., of material obtained from the digester (the heating being carried out for instance in one ton lots). I employ 1000 kgs. of this material, and it is exhausted by sodium carbonate, thus forming an impure sodium aluminate liquor; the said 1000 kgs. are replaced by another 1000 kgs. of the material taken from the digester. The liquor which is mixed with the 11 tons of material will furnish by decantation a purified liquor which is then precipitated by carbonic acid.

From the 11 tons used for the purifying, I again remove 1 ton which is at once replaced by 1 ton of the product obtained from a new heating.

The crude bath obtained by this new removal of material is again mixed with the mass, thus furnishing a fresh quantity of purified liquor, and so on.

The proportions of the substances in use will be somewhat changed during the first operations, but after a certain time there will be set up an equilibrium which will be no longer disturbed to any extent.

Pursuing my searches further, I have found that in order to obtain alumina which is still purer, it was possible to use the alkaline sulphides.

For this purpose, the liquor of alkali aluminate is treated by the sodium or potassium sulphide which acts as a reducer for the oxygenated alkali salts (chromates, ferrates, silicates, vanadates, and the like). By this treatment, it is possible to obtain a precipitate which contains impurities, among which, according to the nature of the treated solutions, there will generally be metals whose recovery may be of certain interest.

On the other hand, it will be possible after the previous purification (or independently therefrom), to treat the liquor of alkali aluminate, already purified or not, with a suitable quantity of alkali zincate which is precipitated by the alkaline sulphide.

The zinc precipitate which is thus obtained in this way carries along the gallium in solution and allows to recuperate the same.

What I claim is:—

1. A process for the manufacture of alumina, comprising a first step of the treatment consisting in treating non-halogenated ores of alumina by alkali earth bases in the presence of water, in order to produce a hydrated alkali earth aluminate, a second step which consists in causing the said hydrated alkali earth aluminate to react with a sodium salt, the alkali earth salt corresponding to which is less soluble than the alkali earth aluminate, and a third step consisting in extracting the alumina from the sodium aluminate formed during the second stage.

2. A process for the manufacture of alumina, as claimed in claim 1, in which the first step is carried out in the hot state and under pressure in a digester.

3. A process for the manufacture of alumina, as claimed in claim 1, in which, if the hydrated alkali earth aluminate obtained in the first step is soluble in water, it is converted, before proceeding with the second step of the treatment, into an insoluble alkali earth aluminate by filtration and then by precipitating by lime, the resulting alkali earth aluminate being then treated in the second step by a sodium salt, the alkali earth salt corresponding to which is less soluble than the alkali earth aluminate, the third step consisting in extracting the alumina from the sodium aluminate formed during the second stage.

4. A process for the manufacture of alumina which consists in treating non-halogenated ores of alumina with baryta in order to form soluble hydrated aluminate of baryta in the presence of water, in filtering the solution of the said aluminate, in precipitating it by lime to form insoluble hydrated aluminate of calcium, in treating this precipitate by a sodium salt, the alkali earth salt corresponding to which is less soluble than the alkali earth aluminate, and in treating the sodium aluminate in order to extract therefrom the alumina.

5. A process for the manufacture of alumina consisting in treating in the presence of water non-halogenated ores of alumina by an alkali earth base in the proportion of four molecules of said alkali earth base for one molecule of alumina in the ore and, if necessary, two to three molecules of the alkali earth base for one molecule of silica in the ore, in forming a hydrated alkali earth aluminate by said treatment, in treating the said hydrated alkali earth aluminate by a sodium salt, the alkali earth salt corresponding to which is less soluble than the alkali earth aluminate and in extracting the alumina from the sodium aluminate formed during the second stage.

6. In a process for the manufacture of alumina by the wet treatment of non-halogenated ores of alumina by alkali earth bases, the simultaneous use of a plurality of alkali earth bases some of which afford the insoluble aluminates and the others soluble aluminates.

7. In a process for the manufacture of alumina by the wet treatment of a mixture of the non-halogenated ores of aluminium by alkali earth bases, the simultaneous use of baryta and lime.

8. A process for the manufacture of alumina, comprising a first step of the treatment consisting in treating non-halogenated ores of alumina by alkali earth bases in the presence of water, in order to obtain a hydrated alkali earth aluminate, a second step which consists in causing the said hydrated alkali earth aluminate to react with sodium carbonate, and a third step consisting in extracting the alumina from the sodium aluminate formed during the second stage.

In testimony whereof I have signed this specification.

JEAN CHARLES SÉAILLES.